(12) United States Patent
DiVerdi et al.

(10) Patent No.: US 10,701,431 B2
(45) Date of Patent: Jun. 30, 2020

(54) HANDHELD CONTROLLER GESTURES FOR VIRTUAL REALITY VIDEO PLAYBACK

(71) Applicant: ADOBE INC., San Jose, CA (US)

(72) Inventors: Stephen Joseph DiVerdi, Oakland, CA (US); Seth John Walker, Oakland, CA (US); Brian David Williams, San Jose, CA (US)

(73) Assignee: Adobe Inc., San Jose, CA (US)

( * ) Notice: Subject to any disclaimer, the term of this patent is extended or adjusted under 35 U.S.C. 154(b) by 214 days.

(21) Appl. No.: 15/814,731

(22) Filed: Nov. 16, 2017

(65) Prior Publication Data

US 2019/0149873 A1    May 16, 2019

(51) Int. Cl.
*G06F 3/0346* (2013.01)
*H04N 21/422* (2011.01)
(Continued)

(52) U.S. Cl.
CPC ....... *H04N 21/42222* (2013.01); *G06F 3/011* (2013.01); *G06F 3/017* (2013.01);
(Continued)

(58) Field of Classification Search
CPC ....... H04N 21/42222; H04N 21/42219; H04N 21/47217; G06F 3/011; G06F 3/0346; G06F 3/014; G06F 3/017
See application file for complete search history.

(56) References Cited

U.S. PATENT DOCUMENTS

| 7,165,219 B1 * | 1/2007 | Peters | G11B 27/005 715/716 |
| 8,072,424 B2 * | 12/2011 | Liberty | G06F 3/017 345/156 |

(Continued)

OTHER PUBLICATIONS

Nguyen, C., DiVerdi, S., Hertzmann, A., & Liu, F. (May 2017). Vremiere: In-Headset Virtual Reality Video Editing. In Proceedings of the 2017 CHI Conference on Human Factors in Computing Systems (pp. 5428-5438). ACM.
(Continued)

*Primary Examiner* — Nasser M Goodarzi
*Assistant Examiner* — Patrick A Ryan
(74) *Attorney, Agent, or Firm* — Shook, Hardy & Bacon, LLP

(57) ABSTRACT

Embodiments disclosed herein facilitate virtual reality (VR) video playback using handheld controller gestures. More specifically, jog and shuttle gestures are associated with controller rotations that can be tracked once a triggering event is detected (e.g., pressing and holding a controller play button). A corresponding jog or shuttle command can be initialized when the VR controller rotates more than a defined angular threshold in an associated rotational direction (e.g., yaw, pitch, roll). For example, the jog gesture can be associated with changes in controller yaw, and the shuttle gesture can be associated with changes in controller pitch. Subsequent controller rotations can be mapped to playback adjustments for a VR video, such as a frame adjustment for a jog gesture and a playback speed adjustment for the shuttle
(Continued)

gesture. Corresponding visualizations of available gestures and progress bars can be generated or otherwise triggered to facilitate efficient VR video playback control.

20 Claims, 7 Drawing Sheets

(51) Int. Cl.
 *H04N 21/472* (2011.01)
 *G06F 3/01* (2006.01)
(52) U.S. Cl.
 CPC ..... *G06F 3/0346* (2013.01); *H04N 21/42219* (2013.01); *H04N 21/47217* (2013.01)

(56) References Cited

U.S. PATENT DOCUMENTS

| | | | | |
|---|---|---|---|---|
| 9,805,512 | B1* | 10/2017 | Katz | G02B 27/017 |
| 2007/0113207 | A1* | 5/2007 | Gritton | G06F 3/017 |
| | | | | 715/863 |
| 2009/0304349 | A1* | 12/2009 | Nomoto | G11B 27/005 |
| | | | | 386/343 |
| 2017/0154455 | A1* | 6/2017 | Park | H04N 13/243 |
| 2017/0220120 | A1* | 8/2017 | Westbrook | G06F 3/017 |
| 2017/0329488 | A1* | 11/2017 | Welker | G06F 3/0304 |
| 2018/0035170 | A1* | 2/2018 | Liu | G06T 11/60 |
| 2018/0046253 | A1* | 2/2018 | Ho | G06F 3/017 |
| 2018/0096507 | A1* | 4/2018 | Valdivia | G06F 1/163 |
| 2019/0018498 | A1* | 1/2019 | West | G06F 3/017 |

OTHER PUBLICATIONS

Nguyen, C., DiVerdi, S., Hertzmann, A., & Liu, F. (Oct. 2017). CollaVR: Collaborative In-Headset Review for VR Video. In Proceedings of the 30th Annual ACM Symposium on User Interface Software and Technology (pp. 267-277). ACM.

* cited by examiner

HANDHELD CONTROLLER GESTURES FOR VIRTUAL REALITY VIDEO PLAYBACK

BACKGROUND

Some creative professionals develop spherical videos for playback in virtual reality (VR) environments such as VR headsets. Although spherical videos are often intended for playback in a VR headset, editing generally occurs in conventional 2D video editing software such as Adobe® Premiere. Recently, some approaches have been developed to edit videos directly in a VR environment in which users can load a spherical video, watch the video while it plays in a VR headset, and use handheld VR controllers to control playback and edit the video.

A prior implementation of playback controls involved 3D pointing tasks. More specifically, the prior implementation required a user to point at various visualizations displayed in a VR headset (e.g., visualizations of playback and pause buttons, a video timeline, etc.). In this implementation, a user holds a handheld VR controller, and the VR headset displays a corresponding image of the controller emitting a laser pointer. When the user moves the handheld controller in the real world, the corresponding controller image and laser pointer move in the headset display. In this manner, a user can point the laser pointer at a desired playback or pause button and click to control video playback. Similarly, the user can point the laser pointer at the video timeline in the headset, and grab and scrub the timeline to adjust the location of the video to playback.

SUMMARY

Embodiments of the present invention are directed to handheld controller gestures for VR video playback. More specifically, jog and shuttle gestures can be associated with rotations of a handheld VR controller. For example, controller rotations can be tracked once a triggering event is detected. A corresponding command can be initialized when the VR controller rotates more than a defined initialization threshold (e.g., an angular threshold, such as 5°, 10°, etc.) in a selected rotational direction (e.g., yaw, pitch, roll). A playback adjustment for a VR video can be determined based on the initialized command and a subsequent controller rotation. For example, when the initialized command is a jog command, a frame adjustment of the VR video can be determined based on angular increments of the subsequent controller rotation. When the initialized command is a shuttle command, a playback speed adjustment can be determined based on angular increments of the subsequent controller rotation.

Exemplary jog and shuttle gestures can be triggered by a user pressing and holding a VR controller button, such as a play/pause button. In one embodiment, the jog gesture is associated with changes in controller yaw, and the shuttle gesture is associated with changes in controller pitch. Once a triggering event is detected, a visualization of available gestures can be generated or otherwise triggered. For example, in the preferred embodiment described above, the visualization of available gestures can include a horizontal component indicating the jog gesture is associated with changes in controller yaw, and a vertical component indicating the shuttle gesture is associated with changes in controller pitch.

Once the VR controller rotates more than a defined angular threshold in one of the defined rotational directions, a corresponding command can be initialized. Continuing with the example described above, if the change in controller yaw exceeds an angular threshold before the change in controller pitch does, a jog command is initialized. Once a command is initialized, the visualization of available gestures can be replaced with a progress bar corresponding to the initialized command. For example, for a yaw-based gesture, the progress bar might include a horizontal bar that fills as a function of subsequent controller yaws. For a pitch-based gesture, the progress bar might include a vertical bar that fills as a function of subsequent changes in controller pitch. Once a command is initialized for a gesture, subsequent controller rotations can be mapped to a playback adjustment for a VR video. For an example jog command, subsequent controller rotations (e.g., $-180°>x>+180°$) of a defined angular increment (e.g., 5°) can be mapped to a corresponding frame adjustment (e.g., $-36$ frames$>x>+36$ frames). For an example shuttle command, subsequent controller rotations (e.g., $-90°>x>+90°$) of a defined angular increment (e.g., 18°) can be mapped to a corresponding adjustment in playback speed (e.g., $-4\times$, $-2\times$, $-1\times$, $-½$, $-¼$, 0, ¼, ½, 1×, 2×, 4×).

BRIEF DESCRIPTION OF THE DRAWINGS

The present invention is described in detail below with reference to the attached drawing figures, wherein.

DETAILED DESCRIPTION

Overview

Figure 1:
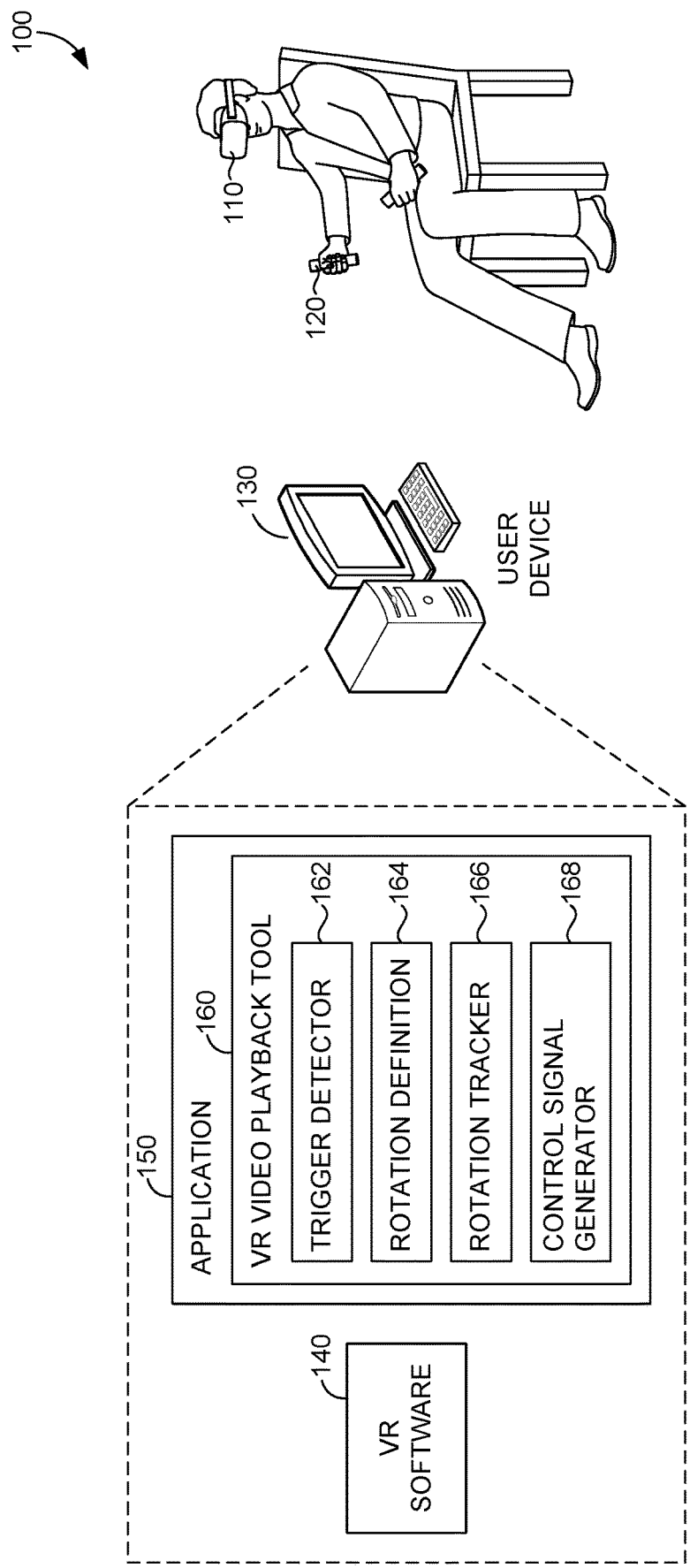
FIG. 1 is a block diagram of an exemplary computing system for VR video playback, in accordance with embodiments of the present invention.

Generally, conventional desktop user interfaces, such as those used in video editing software such as Adobe® Premiere, provide functionality using two different levels of accessibility. First, user interface elements, such as buttons and menus, are presented on a 2D display. Second, an I/O device, such as a mouse, receives user inputs to interact with the user interface elements. These two levels of accessibility can encode many possible interactions with many possible tools. These interactions generally require some cognitive load from the user. For example, a user may have to look at a display, figure out where the mouse is, move the mouse around, select a mouse button, click and drag an element on the display, and the like. If a user wants to watch a video and perform actions such as playing and pausing the video, adjusting the playback speed, or moving one or two frames ahead, there may be increased demands on the cognitive load because the user generally will want to watch the video while interacting with the user interface.

In desktop GUI's, keyboard shortcuts can be defined. Such keyboard shortcuts may be preferred because users can execute them without looking at the keyboard, while receiving the benefit of tactile feedback. For example, tactile feedback can allow a user to perceive which button the user is pressing and whether the user's hands are the proper location. As such, a user may be able to use keyboard shortcuts without having to think about them, which reduces the cognitive load for common operations.

Dedicated video workstations often include a jog shuttle controller, which is a dial that permits two types of interactions. First, inside the dial is a spinner with steps of angular increments. As a user rotates the spinner past each step, the video advances or reduces by one frame, depending on the direction of rotation, and the user receives haptic feedback (e.g., a bump from the spinner at each step). Second, around the ring of the dial is a shuttle. As a user twists the shuttle, depending on how far it is twisted and in what direction, the playback speed can change. The shuttle can be spring-loaded such that when a user twists the shuttle to the right or to the left, the shuttle returns to a neutral position and a playback speed of zero. Twisting the shuttle forward can increase playback speed by an amount that increases as the shuttle rotation increases (e.g., increasing playback speed from 0 to ¼ to ½ to ¾ to 1× to 2× to 4× to 8×). Similarly, twisting the shuttle backwards can decrease playback speed by an amount that decreases as the shuttle rotation increases (e.g., decreasing playback speed from 0 to −¼ to −½ to −¾ to −1× to −2× to −4× to −8×). When the user lets go of the shuttle, it springs back to the neutral position, and the video stops. Using a dedicated jog shuttle controller can make video editing much easier since a user may not need to look at, or think about, using the controller while navigating a video. Video editing software can implement similar functionality with keyboard shortcuts to improve ease of use, for example, by assigning certain keys for increasing playback speed, advancing one frame, etc.

Turning now to video playback in virtual reality (VR), in general, video navigation is likely to be a primary task of any user seeking to perform VR video editing directly in a VR environment (e.g., a VR headset). A prior implementation of playback controls involved 3D pointing tasks. More specifically, the prior implementation required a user to point at various visualizations displayed in a VR headset (e.g., visualizations of playback and pause buttons, a video timeline, etc.). In this implementation, a user holds a handheld VR controller, and the VR headset displays a corresponding image of the controller emitting a laser pointer. When the user moves the handheld controller in the real world, the corresponding controller image and laser pointer move in the headset display. In this manner, a user can point the laser pointer at a desired playback or pause button and click to control video playback. Similarly, the user can point the laser pointer at the video timeline in the headset, and grab and scrub the timeline to adjust the location of the video to playback. This interaction requires a user to look at what the laser pointer is pointing at, think about where the laser point is pointing, perform a complex hand interaction to move the laser pointer, look at where the laser point is moving, look at the video, move his/her hand slightly, and observe a change in the video playback location. Such an interaction requires a significant cognitive load. Hence, techniques disclosed herein provide controller gestures for VR video playback that decrease the demand on a user's cognitive load. More specifically, controller gestures for video navigation are described that do not require a 3D pointing task.

Generally, gestures are a convenient way of providing functionality in 3D interfaces and VR, where there is no keyboard. For example, gestures are convenient because a gesture can be initiated, for example, wherever a user's hand is located. However, few VR systems include gesture input. Moreover, those systems that do primarily focus on the types of gestures that are common in multi-touch interfaces, such as swipe left or right. For example, a VR gesture can be defined to grab and move left or right, where moving far enough completes the gestures. Other VR gestures may be defined based on a 2D gesture in which a 2D shape is drawn by moving the hand through a series of positions, such as a circle or square. Each of these VR gesture types is motivated by 2D GUI gesture recognition. Instead, VR gestures are defined herein based on 3D rotations of a handheld controller.

Generally, VR systems track VR controllers with six degrees of freedom: three degrees of position (e.g., XYZ) and three angles of rotation (e.g., yaw, pitch and roll). In VR systems that use tracked controller position and rotation to display a corresponding image of the controller emitting a laser pointer, users manipulate the controller position and angle in the real world to project this laser into virtual space. However, people tend to think about these interactions in 2D terms, such as where the laser pointer is moving while it is intersecting with a panel or other plane in the virtual world. As such, VR controller rotations are rarely utilized and are therefore well-suited for use in VR controller gestures.

Accordingly, embodiments of the present invention are directed to handheld controller gestures for VR video playback that utilize controller rotations. A play button can be defined on the controller that can be pressed at any time to play or pause the video. Jog and shuttle gestures can be performed by pressing and holding a controller button (e.g., the play button) and rotating the controller in a defined rotational direction (e.g., around a rotational axis). For example, the controller's yaw, pitch or roll can be used for a jog or shuttle gesture. In one embodiment, a jog gesture is performed by holding down the play button and moving the controller through yaw, and a shuttle gesture is performed by holding down the play button and moving the controller through pitch. In this manner, a gesture can be initiated using a handheld controller, regardless of the position or orientation of a user's hands. Such gestures decrease the demand on a user's cognitive load and increase ease of use, for example, because a user no longer needs to look at or think about the location or orientation of his/her controller hand in order to initiate the gesture.

In some embodiments, a jog gesture can be performed by holding the play button and yawing the controller. As the controller is rotated through a defined angular increment (e.g., every 5°), the video frame is advanced (e.g., by yawing to the right) or reduced (e.g., yawing to the left) by a defined number of frames (e.g., one). To move forward a large number frames, the user can hold the play button, sweep to the right, release the play button, move back to left, and repeat. Additionally and/or alternatively, a shuttle gesture can be performed by holding the play button and tilting the controller (i.e., changing the controller pitch). As the controller is tilted through a defined angular increment (e.g., every 18°), the playback speed is increased (e.g., by tilting up) or decreased (e.g., tilting down) in defined increments (e.g., −4×, −2×, −1×, −½, −¼, 0, ¼, ½, 1×, 2×, 4×). This pairing of jog and shuttle gestures to corresponding rotational axes is exemplary, and other pairings (e.g., including controller rolls), may be implemented.

In some embodiments, one or more user interface elements can be provided to support the gestures. For example, when a user presses and holds a button that enables the jog and shuttle gestures (e.g., the play button), a visualization of available gestures can be provided in the VR world (e.g., displayed in a VR headset). By way of nonlimiting example, an image of one or more bars (e.g., a horizontal bar, a vertical bar and/or a combination such as a cross) can be provided to assist a user in discovering pitch and yaw gestures. Similarly, a curved image (e.g., an arc, circle, spiral, etc.) can be provided to assist a user in discovering a roll gesture. Additionally and/or alternatively, one or more progress bars can be displayed once a user has initiated a gesture. For example, once a user initiates a gesture rotation, a corresponding command can be initialized, and the visualization of available gestures can be replaced with a progress bar corresponding to the direction of rotation (e.g., a horizontal bar, vertical bar, curved bar, etc.). The progress bar can fill gradually to indicate a detected rotation of a gesture.

As such, using implementations described herein, a user can efficiently and effectively control VR video playback using handheld controller rotations to perform jog and shuttle gestures. Visualizations of available gestures and progress bars can assist the user in performing these gestures, reducing the demand on a user's cognitive load and increasing ease of use.

Having briefly described an overview of aspects of the present invention, various terms used throughout this description are provided. Although more details regarding various terms are provided throughout this description, general descriptions of some terms are included below to provider a clearer understanding of the ideas disclosed herein:

VR video—VR video generally refers to spherical panorama (full or partial) video, 360° video, or any other immersive video capable of playback in a virtual reality environment such as a head-mounted display (e.g. a VR headset).

VR system—Generally, a virtual reality system is any system capable of displaying spherical videos. For example, tethered VR systems can include components such as a VR display (e.g., a VR headset), one or more VR controllers, tracking components for tracking controller and/or user movement (e.g., sensors such as cameras, accelerometers, gyroscopes, etc.) and a computer (e.g., desktop computer, gaming console, etc.) to run the system. Some VR systems can utilize a mobile headset with optical components to transform a smart phone or other handheld display device into a VR headset, and use the handheld device to perform system processing. Some VR systems can be implemented using a standalone VR headset that performs system operations. Other variations of VR systems and VR system components are possible. Generally VR system components are in communication with one another using any wired and/or wireless protocol (e.g., HDMI, USB, WiFi, Bluetooth, etc.).

Jog—Jog refers to a video playback function where a video is advanced or reduced by a defined number of frames (e.g., one frame) for each incremental input (e.g., steps of a dial, button presses, angular increments of a controller rotation, etc.).

Shuttle—Shuttle refers to a video playback function where video playback speed is advanced or reduced for each incremental input (e.g., steps of a dial, button presses, angular increments of a controller rotation, etc.).

Exemplary Virtual Reality Environment

Referring now to FIG. 1, an example VR system suitable for use in implementing embodiments of the invention is shown. Generally, VR system 100 is suitable for VR video playback, and, among other things, facilitates VR video playback using handheld controller rotations. VR system 100 includes VR display 110 (e.g., a head-mounted display), VR controller 120 and user device 130. User device 130 can be any kind of computing device capable of facilitating VR video playback. For example, in an embodiment, user device 130 can be a computing device such as computing device 700, as described below with reference to FIG. 7. In embodiments, user device 130 can be a personal computer (PC), a gaming console, a laptop computer, a workstation, a mobile computing device, a PDA, a cell phone, or the like. Moreover, although VR display 110 and user device 130 are depicted as separate components, this need not be the case. For example, VR display 110 and user device 130 can operate as one standalone VR headset. In some embodiments, VR system 100 includes one or more tracking components (not depicted) for tracking controller and/or user movement (e.g., sensors such as cameras, accelerometers, gyroscopes, etc.). Generally, the components of VR system 100 are communicatively coupled to one another, for example, using one or more wired and/or wireless protocols (e.g., HDMI, USB, WiFi, Bluetooth, etc.). Variations of VR system configurations will be understood by a person of ordinary skill in the art and can be implemented within the present disclosure.

Generally, VR system 100 includes VR software (e.g., system software, middleware, application software, etc.) configured to perform various VR system operations, such as rendering VR video for display on VR display 110 and facilitating gestures for VR video playback by accessing state information for VR controller 120 (e.g., button states, position, orientation, etc.). For example, VR software can reside on (e.g., operations can be performed using) user device 130, VR display 110, VR controller 120, some other component(s), or any combination thereof. By way of non-limiting example, user device 130 can include VR software (e.g., VR software 140) configured to receive a VR video (e.g., via a software API), render the VR video, and transmit the rendered VR video to VR display 110. Likewise, user device 130 can include VR software (e.g., VR software 140) configured to access state information for VR controller 120 (e.g., provided by controller 120, detected using one or more tracking or other components, some combination thereof, etc.). As such, VR software can utilize the state information for VR controller 120, or provide it to another component (e.g., application 150 and/or VR video playback tool 160), to determine whether a user is performing one or more defined gestures (e.g., gestures for VR video playback).

In some embodiments, user device 130 includes a VR video playback tool (e.g., VR video playback tool 160). The VR video playback tool may be incorporated, or integrated, into an application or an add-on or plug-in to an application (e.g., a video playback and/or editing application, VR software developed for VR headsets, etc.). The application (e.g., application 150) may generally be any application capable of facilitating VR video playback. As can be appreciated, in some embodiments, in addition to facilitating VR video playback, the application may also facilitate VR video editing. The application may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). One exemplary application that may be used for VR video editing is Adobe® Premiere, which is a professional video editing application, with a VR video playback tool (e.g., a VR video playback plug-in). Although the VR video playback tool is generally discussed herein as being associated with an application, in some cases, the VR video playback tool, or a portion thereof, can be additionally or alternatively integrated into the operating system (e.g., as a service) or a server (e.g., a remote server).

In the embodiment depicted in FIG. 1, user device 130 includes VR software 140 (e.g., VR software developed for VR headsets such as Oculus Rift®, HTC Vive®, PlayStation VR®, etc.). VR software 140 can include a software API for application 150 and/or VR video playback tool 160. Application 150 can be a video playback and/or editing application such as Adobe® Premiere. Although application 150 and VR video playback tool 160 are depicted as residing on user device 130, this need not be the case. In the embodiment depicted in FIG. 1, VR video playback tool 160 accesses state information for VR controller 120 using the software API, interprets the state information to detect when a defined gesture is performed, and determines a corresponding playback adjustment to control VR video playback. In some embodiments, VR video playback tool 160 generates a corresponding control signal that is generally used to control VR video playback. For example, a VR video file may be loaded in VR software 140 and/or VR display 110, and VR video playback tool 160 can provide the control signal to VR software 140 for rendering and/or output of the VR video file on VR display 110 using the control signal. In some embodiments, VR video playback tool 160 may perform some or all of the rendering, and provide a corresponding VR video playback stream for output on VR display 110. Other variations of VR video rendering and control systems will be understood by a person of ordinary skill in the art, and can be implemented within the present disclosure.

Generally, the playback adjustment (e.g., the control signal and/or its effect on VR video playback) will depend on the gesture being performed. As explained below, VR video playback tool 160 can detect jog and shuttle gestures by detecting rotations of VR controller 120 from the accessed state information.

Jog and shuttle gestures can be associated with rotations of VR controller 120, such as rotations around a selected rotational axis. For example, a gesture can be triggered by a defined triggering event (e.g., a button press, a press and hold, a defined triggering gesture, a defined controller position, a defined controller orientation, combinations thereof, etc.). The triggering event can be detected from state information of a handheld controller. Once a triggering event is detected, a command can be initialized when a defined rotation is detected. For example, a command can be initialized when VR controller 120 rotates more than a defined initialization threshold (e.g., a user-configurable or fixed angular threshold such as 5°, 10°, etc.) in a selected rotational direction (e.g., yaw, pitch, roll). Once a command is initialized, subsequent rotations (e.g., in the initialized direction) can be mapped to one or more playback functions (e.g., jog, shuttle, etc.). For example, rotations of a selected angular increment (e.g., 5°, 10°, user configurable, etc.) can be mapped to increments of a virtual jog or shuttle function (e.g., via corresponding values of a control signal). As such, jog and shuttle gestures and corresponding commands can be associated with changes in controller yaw, pitch and/or roll.

Generally, a gesture such as a jog or shuttle gesture can be associated with a selected controller rotation, such as a yaw, pitch or roll. For example, in some embodiments, a gesture can be associated with a change in controller roll. This may improve the ease of use for some users since a corresponding twisting motion may be perceived as similar to the motion required to operate a physical jog shuttle controller. In one embodiment, a jog gesture is associated with a change in controller yaw, and a shuttle gesture is associated with a change in controller pitch. For example, a jog gesture can be triggered by a button press and hold (e.g., a play button) and associated with a change in controller yaw. Similarly, a shuttle gesture can be triggered by a button press and hold (e.g., a play button) and associated with a change in controller pitch.

The selected controller rotation can be measured with respect to a defined frame of reference. For example, in some embodiments, axis-aligned rotations are determined with respect to a baseline frame of reference (e.g., a defined world space). For example, rotations can be determined with respect to rotational axes that are fixed to a defined world space. In some embodiments, controller-aligned rotations are determined with respect to a frame of reference defined by the orientation of the controller when a triggering event is detected. For example, rotations can be determined with respect to rotational axes that are aligned with the orientation of the controller when a triggering event is detected.

In some embodiments, calibration-aligned rotations are determined with respect to a frame of reference defined by a controller calibration. In one example, a calibration can be performed over multiple users. Generally, not everyone's hands and arms are constructed in the same way, so different rotational gestures may be more comfortable for some people than others. Accordingly, calibration data can be obtained from a group of users by measuring rotational motions made during defined gestures. For example, a group of users can be instructed to use a controller to initiate one or more defined gestures (e.g., yaw the controller left and right, tilt the controller pitch up and down, twist the controller roll left and right), and perform this action any number of times (e.g., once, five times, repeatedly, etc.). Corresponding rotational axes can be determined (e.g., by averaging, taking the median, other statistical methods, etc.) on an individual and/or multiple user basis. For example, a rotational axis around which each user rotated during a defined gesture can be determined, and the determined rotational axis can be averaged over multiple users to generate a calibrated axis for the defined gesture. In another example, a single-user calibration can be performed to determine calibration axes for a single user who prefers a customizable experience. In this manner, using calibrated axes can make for more natural feeling gestures for users.

Turning again to FIG. 1, in the embodiment depicted by FIG. 1, VR video playback tool 160 includes trigger detector 162, rotation definition 164, rotation tracker 166 and control signal generator 168. Generally, trigger detector 162 detects when a defined triggering event occurs (e.g., a button press, a press and hold, a defined triggering gesture, a defined controller position, a defined controller orientation, combinations thereof, etc.). For example, trigger detector 162 can access state information for VR controller 120 and detect a triggering event from the state information (e.g., a press and hold of the controller's play button, an orientation of the controller, etc.). In some embodiments, one or more trigger settings may be configurable, such as the definition of the triggering event and/or one or more trigger-specific settings (e.g., hold duration, triggering positions, triggering orientations, etc.). In this manner, trigger detector 162 detects when a defined triggering event occurs.

Generally, rotation definition 164 includes a definition of the frame of reference used to measure controller rotations. For example, a setting (e.g., fixed, user defined, etc.) can define whether gestures should be detected based on axis-aligned rotations, controller-aligned rotations, single-user calibration-aligned rotations, or multiple-user calibration-aligned rotations. Additionally and/or alternatively, rotation definition 164 can include a setting (e.g., fixed, user defined, etc.) for one or more gesture definitions (e.g., assigning changes in controller yaw to a jog gesture, assigning changes in controller pitch to a shuttle gesture, etc.).

In the embodiment depicted by FIG. 1, when trigger detector 162 detects a triggering event, rotation tracker 166 stores an orientation of VR controller 120 as a baseline for tracking VR controller 120 rotations. More specifically, rotation tracker 166 can track the orientation of VR controller 120 over time in a periodic manner (i.e., by recording multiple values, whether or not in fixed intervals) for some defined duration (e.g., during a press and hold event, optionally including a timeout duration, etc.). For example, rotation tracker 166 can access state information for VR controller 120 (e.g., via a software API of VR software 140) at a given time. The state information can include the orientation of VR controller 120 relative to a defined world space. For example, the accessed orientation can be represented as a matrix (e.g., a transform or rotation matrix), one or more rotational vectors, and/or one or more Euler angles, etc. In some embodiments, the orientation is accessed in one form (e.g., a transform matrix) and converted to another (e.g., Euler angles), as would be understood by a person of ordinary skill in the art. As such, rotation tracker 166 can store an initial orientation of VR controller 120, periodically access a subsequent orientation of VR controller 120, and periodically determine the amount of controller rotation (e.g., in degrees, radians, etc.).

Generally, rotation tracker 166 stores the orientation of VR controller 120 at a time associated with a triggering event (e.g., at the time of the triggering event, at a time following a triggering event, etc.). For example, rotation tracker 166 can store a matrix (e.g., a transform or rotation matrix), rotational vector(s), and/or Euler angle(s). In some embodiments, rotation tracker 166 stores only those orientation elements associated with a defined gesture. For example, where a jog gesture is associated with changes in yaw and a shuttle gesture is associated with changes in pitch, rotation tracker 166 can store corresponding rotational vectors and/or Euler angles of VR controller 120. The stored orientation of VR controller 120 can be compared with subsequently accessed orientations to detect whether and to what extent VR controller 120 has rotated in a particular rotational direction (e.g., yaw vs. pitch vs. roll).

During the tracking, rotation tracker 166 determines a rotational direction of a rotation of VR controller 120 with respect to a defined frame of reference. In embodiments with multiple gestures using multiple rotational axes, rotation tracker 166 makes an initial determination of which direction VR controller 120 is rotating. To accomplish this, rotation tracker 166 periodically determines whether VR controller 120 has rotated more than a defined initialization threshold (e.g., a user-configurable or fixed angular threshold, such as 5°, 10°, etc.) in a rotational direction associated with a defined gesture. To determine the amount of rotation, rotation tracker 166 can access a first orientation (e.g., a stored rotation matrix), access a second orientation (e.g., a rotation matrix accessed via a software API of VR software 140), take the inverse of one rotation matrix, multiply it by the other matrix, and determine the resulting Euler angle (e.g., pitch, yaw, roll). The resulting Euler angle can be compared against the first orientation (e.g., a stored or computed Euler angle) to determine whether a defined initialization threshold has been reached or exceeded. This technique can advantageously avoid the poor interpolation properties of Euler angles near the poles.

By way of nonlimiting example, where a jog gesture is associated with changes in yaw and a shuttle gesture is associated with changes in pitch, rotation tracker 166 determines whether the yaw or the pitch of VR controller 120 has changed by more than a defined angular threshold. In this manner, when a user triggers a gesture, rotation tracker 166 can track how many degrees in pitch and yaw VR controller 120 has been rotated through, and whichever rotation first exceeds the threshold determines the type of command that is initialized. As such, once the rotational direction of VR controller 120 has been determined, rotation tracker 166 initializes a command corresponding to the determined rotational direction.

Once a command (e.g., a jog or shuttle command) has been initialized, rotation tracker 166 can periodically access a subsequent orientation of VR controller 120 and determine the amount of rotation from a preceding (e.g., stored) orientation (e.g., in degrees, radians, etc.), for example, in the manner described above. In one embodiment, once a rotational direction of VR controller 120 has been determined and a corresponding command has been initialized, only subsequent rotations in the same rotational direction are considered for the remainder of the command. Of course, this need not be the case, and other embodiments with other commands can be defined (e.g., defining a different direction to initialize a command than to carry out remaining steps of the command). As such, in the embodiment illustrated in FIG. 1, rotation tracker 166 can determine a change in controller orientation (e.g., a change in yaw, pitch, roll) and provide the delta to control signal generator 168.

In the embodiment depicted in FIG. 1, control signal generator 168 generates a control signal for a gesture (e.g., a jog or shuttle gesture). For example, a jog gesture can be performed by rotating VR controller 120 (e.g., by yawing the controller). As the controller is rotated through a defined angular increment (e.g., every 5°), a control signal can be generated to indicate the controller rotation (e.g., change in yaw). For example, discrete or continuous values of controller rotations (e.g., $-180°>x>+180°$) can be mapped to discrete or continuous values of a control signal (whether absolute or normalized). In one embodiment, the value of the controller rotation can be used as a control signal. A resulting jog control signal (or some other signal or variable corresponding to the controller rotation) can be mapped to an adjustment in VR video playback. As such, the jog control signal can be used (e.g., by VR software 140, application 150, VR video playback tool 160, some other component, or combinations thereof) to advance or reduce frames of a VR video. For example, a video frame can be advanced (e.g., by yawing to the right) or reduced (e.g., yawing to the left) by a defined number of frames based on a mapping between the controller rotation and a playback adjustment. By way of nonlimiting example, a value of a control signal corresponding to a baseline rotation of 0° can be mapped to a VR video stop function, and values of the control signal corresponding to various controller rotations can be mapped to a playback adjustment to advance a VR video (e.g., yawing to the right) or reduce a VR video (e.g., yawing to the left) by one frame for each defined angular increment in a controller rotation. For example, a control signal representing controller rotations (e.g., −180°>x>+180°) of a defined angular increment (e.g., 5°) can be mapped to a corresponding frame adjustment (e.g., −36 frames>x>+36 frames). To move forward a large number frames, a user can execute multiple gestures consecutively. For example, in embodiments where a jog gesture is triggered by a press and hold of the play button and associated with a change in yaw, a user can hold the play button, sweep to the right, release the play button, move back to left, and repeat.

Additionally and/or alternatively, a shuttle gesture can be performed by rotating VR controller 120 (e.g., by tilting the controller to change the pitch). As the controller is tilted through a defined angular increment (e.g., every 18°), a control signal can be generated to indicate the controller rotation (e.g., change in pitch). For example, discrete or continuous values of controller rotations (e.g., −90°>x>+90°) can be mapped to discrete or continuous values of a control signal (whether absolute or normalized). In one embodiment, the value of the controller rotation can be used as the control signal. A resulting shuttle control signal (or some other signal or variable corresponding to the controller rotation) can be mapped to an adjustment in VR video playback. As such, the shuttle control signal can be used (e.g., by VR software 140, application 150, VR video playback tool 160, some other component, or combinations thereof) to increase or decrease playback speed of a VR video. For example, playback speed can be increased (e.g., by tilting up) or decreased (e.g., by tilting down) in defined playback increments (e.g., −4×, −2×, −1×, −½, −¼, 0, ¼, ½, 1×, 2×, 4×) based on a mapping between the controller rotation and the defined increments. By way of nonlimiting example, a value of a control signal corresponding to a baseline rotation of 0° can be mapped to a VR video stop function, and values of the control signal corresponding to various controller rotations can be mapped to a playback speed adjustment to increase (e.g., tilting up) or decrease (e.g., tilting down) the playback speed by one playback increment for each defined angular increment in a controller rotation. For example, a control signal representing controller rotations (e.g., −90°>x>+90°) of a defined angular increment (e.g., 18°) can be mapped to a corresponding adjustment in playback speed (e.g., −4×, −2×, −1×, −½, −¼, 0, ¼, ½, 1×, 2×, 4×).

Generally, if a rotation range with values of controller rotations from −180°>x>+180° is considered, controller rotations of ±180° actually represent the same controller orientation (with respect to a rotational axis of interest). Accordingly, a rotation boundary can be defined and rotations that meet or exceed the rotation boundary can be mapped to selected behaviors. For example, rotations that meet or exceed the rotation boundary can produce no additional playback effect (i.e., the corresponding playback effect peaks at or below a defined boundary). In another example, rotations that meet or exceed the rotation boundary can produce playback effects corresponding to an opposite end of the rotation range (i.e., crossing a rotation boundary flips the detected rotation from positive to negative, and vice versa). In some embodiments, rotations that meet or exceed the rotation boundary can be mapped to a continued rotation range (i.e., the corresponding playback effect continues to increase or decrease, as the case may be).

In some embodiments, one or more user interface elements can be provided to support the gestures. For example, when a triggering event is detected (e.g., a user presses and holds a button) that enables one or more defined gestures (e.g., jog and shuttle gestures), a visualization of available gestures can be generated or otherwise triggered. Generally, the visualization of available gestures may be generated or triggered once a triggering event is detected, but before a corresponding command is initialized. In some embodiments, the visualization of available gestures is generated or triggered after a brief delay from the triggering event, or detection thereof (e.g., 500 ms, 1 s, etc.). By way of nonlimiting example, an image of one or more bars (e.g., a horizontal bar, a vertical bar and/or a combination such as a cross) can be generated or triggered to assist a user in discovering pitch and yaw gestures. Similarly, a curved image (e.g., an arc, circle, spiral, etc.) can be provided to assist a user in discovering a roll gesture.

Additionally and/or alternatively, one or more progress bars can be generated or otherwise triggered once a command has been initialized. For example, once rotation tracker 166 has determined a rotational direction of VR controller 120, a visualization of available gestures can be replaced with a progress bar corresponding to the determined rotational direction (e.g., a horizontal bar, vertical bar, curved bar, etc.). The progress bar can fill gradually to indicate a detected rotation of a gesture (e.g., based on a change in controller orientation, for example, detected by rotation tracker 166 and/or a corresponding control signal generated by control signal generator 168).

Figure 2:
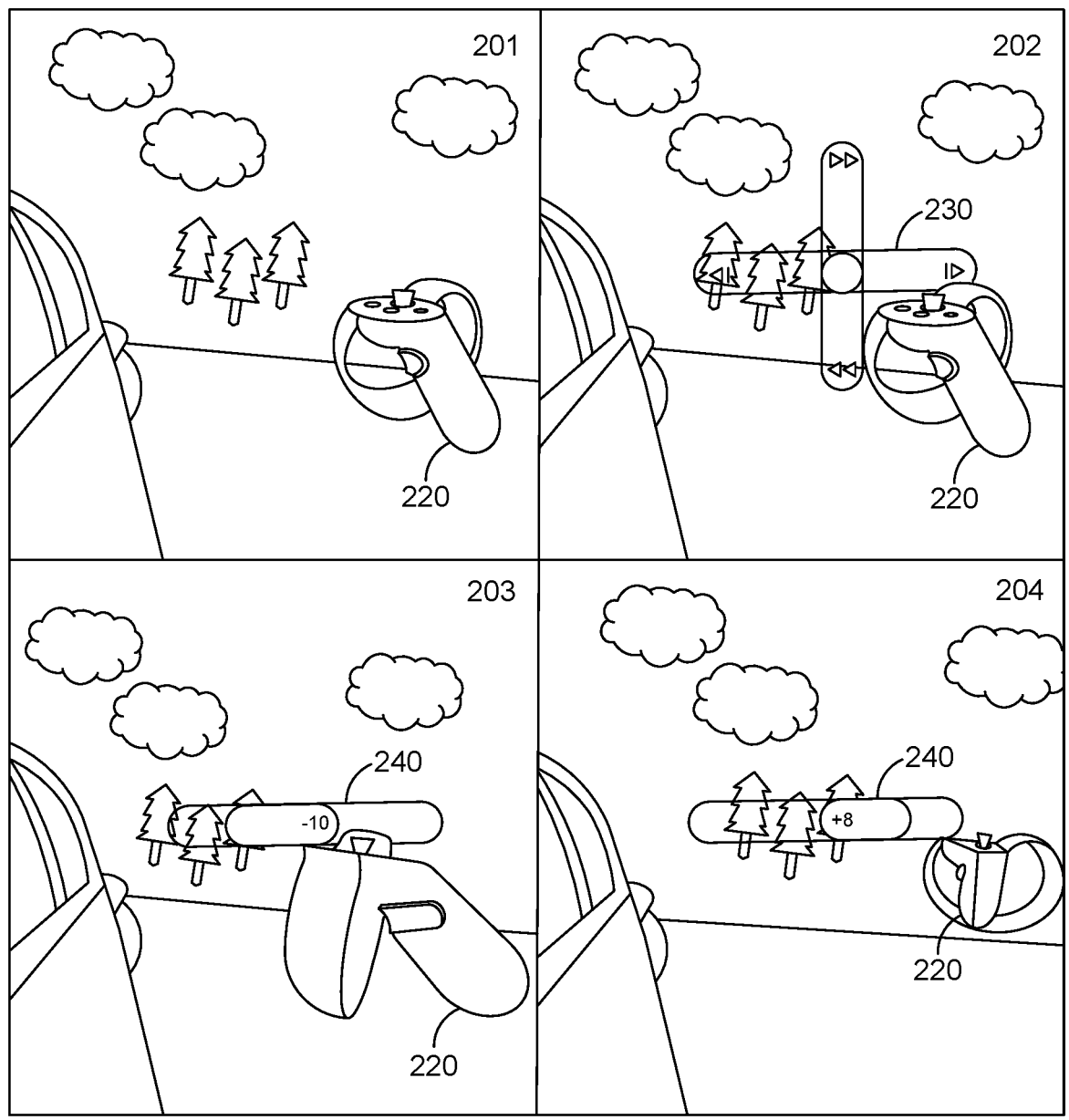
FIG. 2 illustrates an exemplary user interface and jog gesture, in accordance with embodiments of the present invention.
Figure 3:
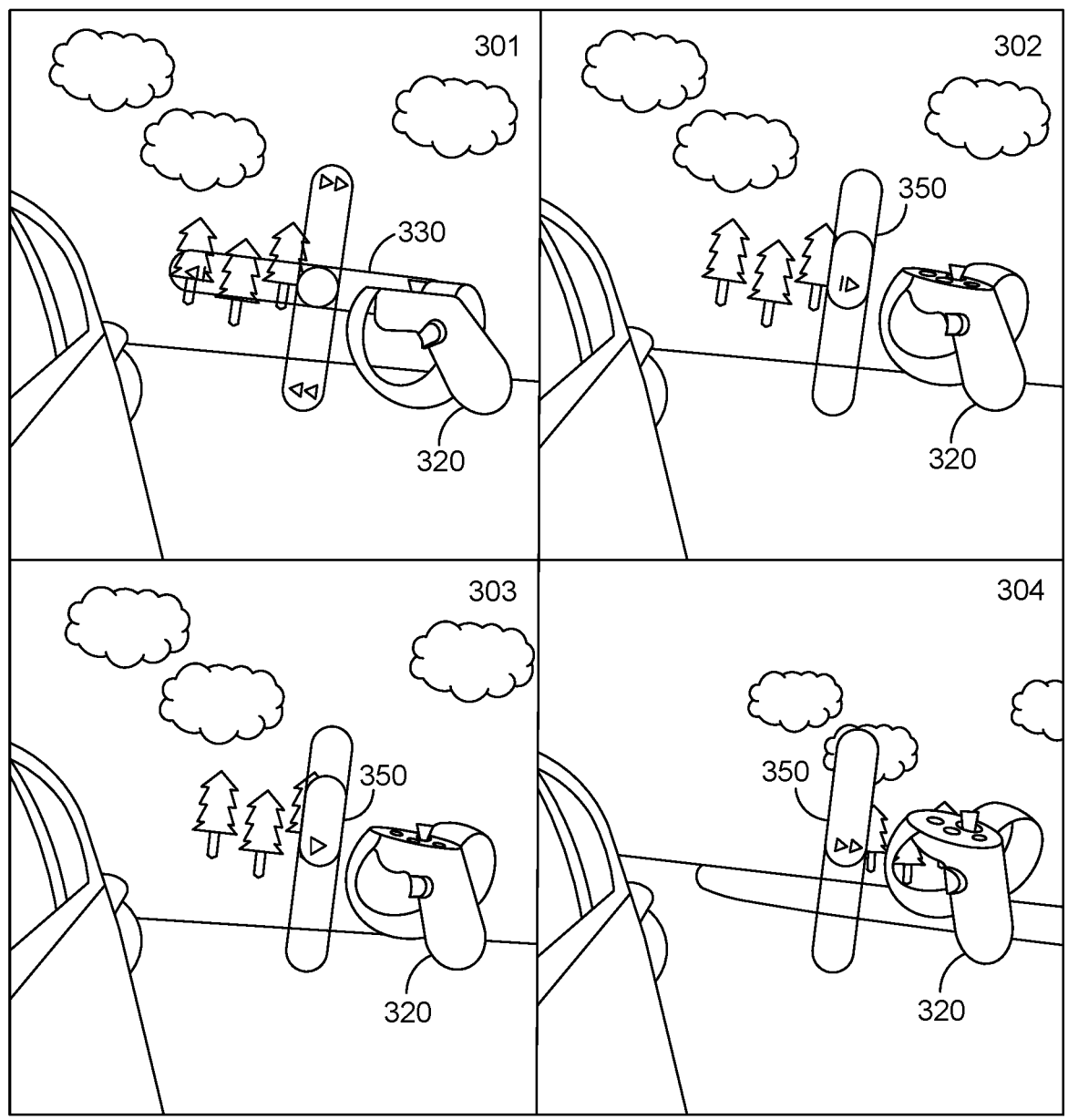
FIG. 3 illustrates an exemplary user interface and shuttle gesture, in accordance with embodiments of the present invention.
Figure 4:
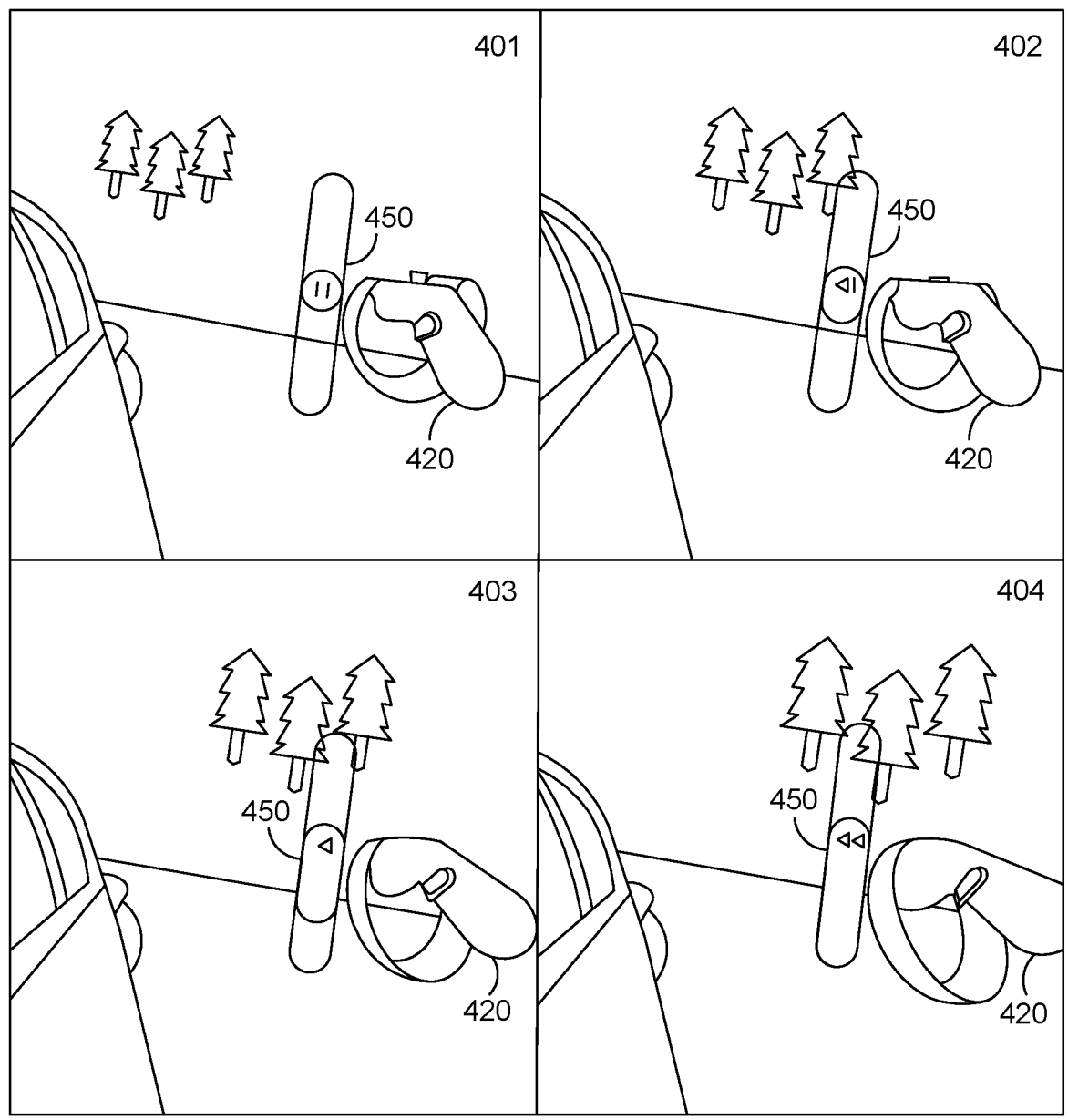
FIG. 4 illustrates an exemplary user interface and shuttle gesture, in accordance with embodiments of the present invention.

Turning now to FIGS. 2-4, FIGS. 2-4 illustrate exemplary user interfaces which may be displayed in a VR display (e.g., VR display 110). Each of FIGS. 2-4 includes four frames representing snapshots of a controller gesture and a corresponding VR video at different times. FIGS. 2-4 include an image of a VR controller (VR controller images 220, 320, 420) that corresponds to the position and orientation of a controller held by a user.

Turning to FIG. 2, FIG. 2 includes frames 201, 202, 203 and 204. Frame 201 depicts a VR video and a VR controller image 220 before a gesture is executed. At frame 202, a triggering event was detected (e.g., a user pressing and holding a play button), and visualization of available gestures 230 is displayed. In this embodiment, the available gestures are jog and shuttle gestures. Visualization of available gestures 230 indicates that the jog gesture is associated with a controller yaw, since the visualization includes a horizontal bar with frame-advance and frame-reduce icons on opposite ends. Similarly, visualization of available gestures 230 indicates that the shuttle gesture is associated with a controller pitch, since the visualization includes a vertical bar with fast-forward and rewind icons on opposite ends. At frame 203, the user has yawed controller to the left. Accordingly, VR controller image 220 is updated in frame 203 to reflect the new orientation, a jog command has been initialized, a corresponding playback effect has occurred, and visualization of available gestures 230 has been replaced with jog progress bar 240. In frame 203, jog progress bar 240 reflects the progress of the VR video playback effect as −10 frames. In frame 204, the user has yawed the controller to the right. Accordingly, VR controller image 220 is updated in frame 204 to reflect the new orientation, a corresponding playback effect has occurred, and jog progress bar 240 reflects the progress of the VR video playback effect as +8 frames.

Turning now to FIG. 3, FIG. 3 includes frames 301, 302, 303 and 304. Frame 301 depicts a VR video and a VR controller image 320 once a triggering event has been detected (e.g., a user pressing and holding a play button), and visualization of available gestures 330 is displayed. In this embodiment, the available gestures are jog and shuttle gestures. At frame 302, the user has tilted the controller up, increasing the controller pitch. Accordingly, VR controller image 320 is updated in frame 302 to reflect the new orientation, a shuttle command has been initialized, a corresponding playback effect has occurred, and visualization of available gestures 330 has been replaced with shuttle progress bar 350. In frame 302, shuttle progress bar 350 reflects the progress of the VR video playback effect with an icon indicating slow playback. In frames 303 and 304, the user has continued to increase the controller pitch. Accordingly, VR controller image 320 is updated in frames 303 and 304 to reflect the new orientations, corresponding playback effects have occurred, and jog progress bar 350 reflects the progress of the VR video playback effects with icons indicating a playback speed of 1× in frame 303 and a playback speed of 2× in frame 304.

Turning now to FIG. 4, FIG. 4 includes frames 401, 402, 403 and 404. Frame 401 depicts a VR video and a VR controller image 420 once a shuttle command has been initialized. In this embodiment, the user's VR controller and corresponding VR controller image 420 are in an orientation corresponding to a baseline rotation of 0°. Accordingly, in frame 401, shuttle progress bar 450 reflects the progress of a corresponding VR video playback effect with an icon indicating the VR video is paused. At frame 402, the user has tilted the controller down, decreasing the controller pitch. Accordingly, VR controller image 420 is updated in frame 402 to reflect the new orientation, a corresponding playback effect has occurred, and shuttle progress bar 450 reflects the progress of the VR video playback effect with an icon indicating slow rewind. In frames 403 and 404, the user has continued to decrease the controller pitch. Accordingly, VR controller image 420 is updated in frames 403 and 404 to reflect the new orientations, corresponding playback effects have occurred, and jog progress bar 450 reflects the progress of the VR video playback effects with icons indicating a −1× rewind speed in frame 403 and a −2× rewind speed of frame 404.

Exemplary Flow Diagram

Figure 5:
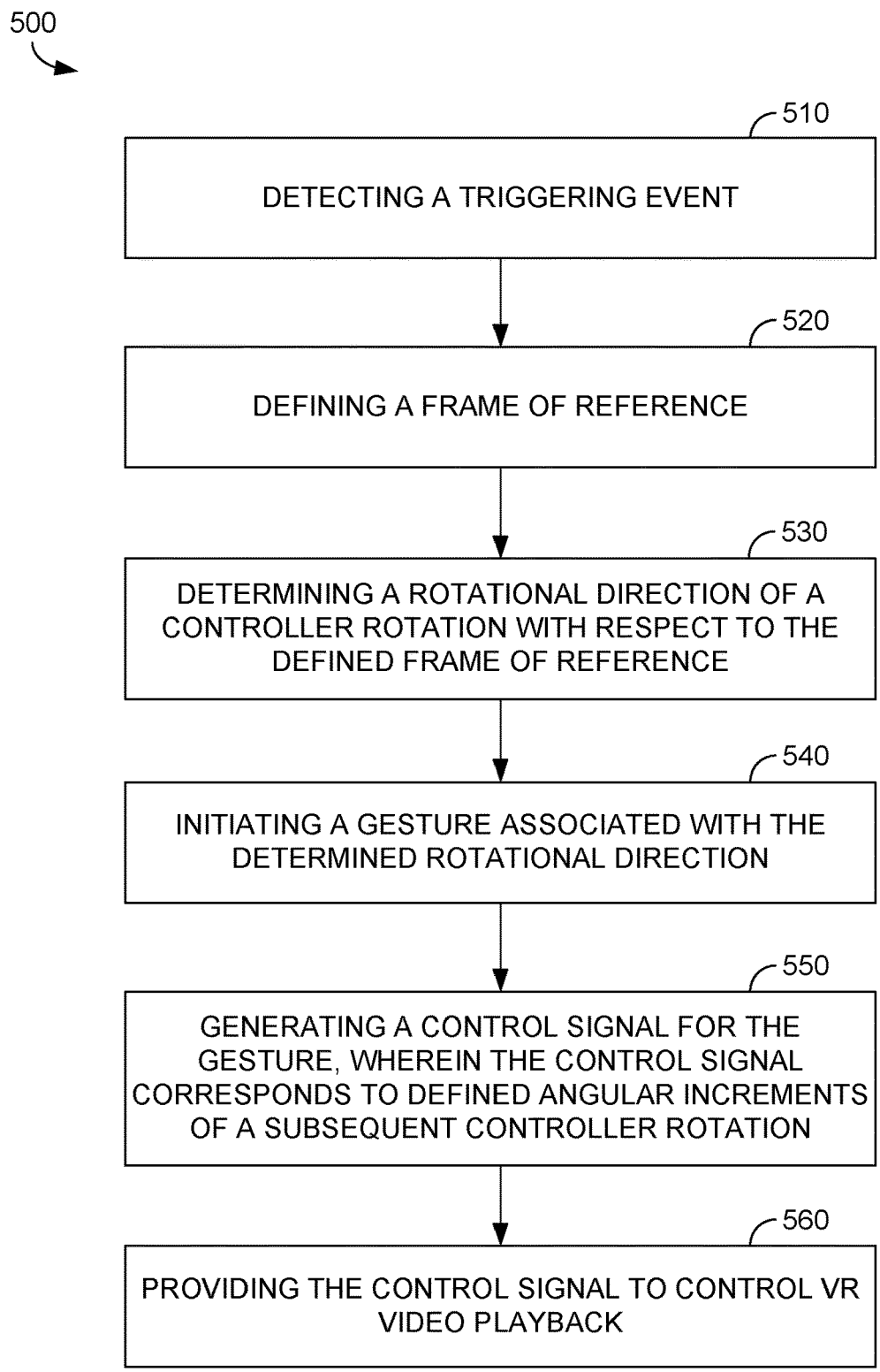
FIG. 5 is a flow diagram showing a method for controlling VR video playback using handheld controller rotations according to various embodiments of the present invention.

With reference now to FIG. 5, a flow diagram is provided illustrating a method for controlling VR video playback using handheld controller rotations. Each block of the method 500 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning now to FIG. 5, FIG. 5 illustrates a method 500 for controlling VR video playback using handheld controller rotations, in accordance with embodiments described herein. Initially at block 510, a triggering event is detected, such as a press and hold event (e.g., of a play button of a handheld VR controller). At block 520, a frame of reference is defined with which to measure controller rotations. For example, a frame of reference can be defined that determines whether gestures should be detected based on axis-aligned rotations, controller-aligned rotations, single-user calibration-aligned rotations, or multiple-user calibration-aligned rotations. At block 530, a rotational direction of a controller rotation is determined with respect to the defined frame of reference. At block 540, a command associated with the determined rotational direction is initialized. At block 550, a control signal for the command is generated, wherein the control signal corresponds to defined angular increments of a subsequent controller rotation. At block 560, the control signal is provided to control VR video playback.

Exemplary Computing Environment

Figure 6:
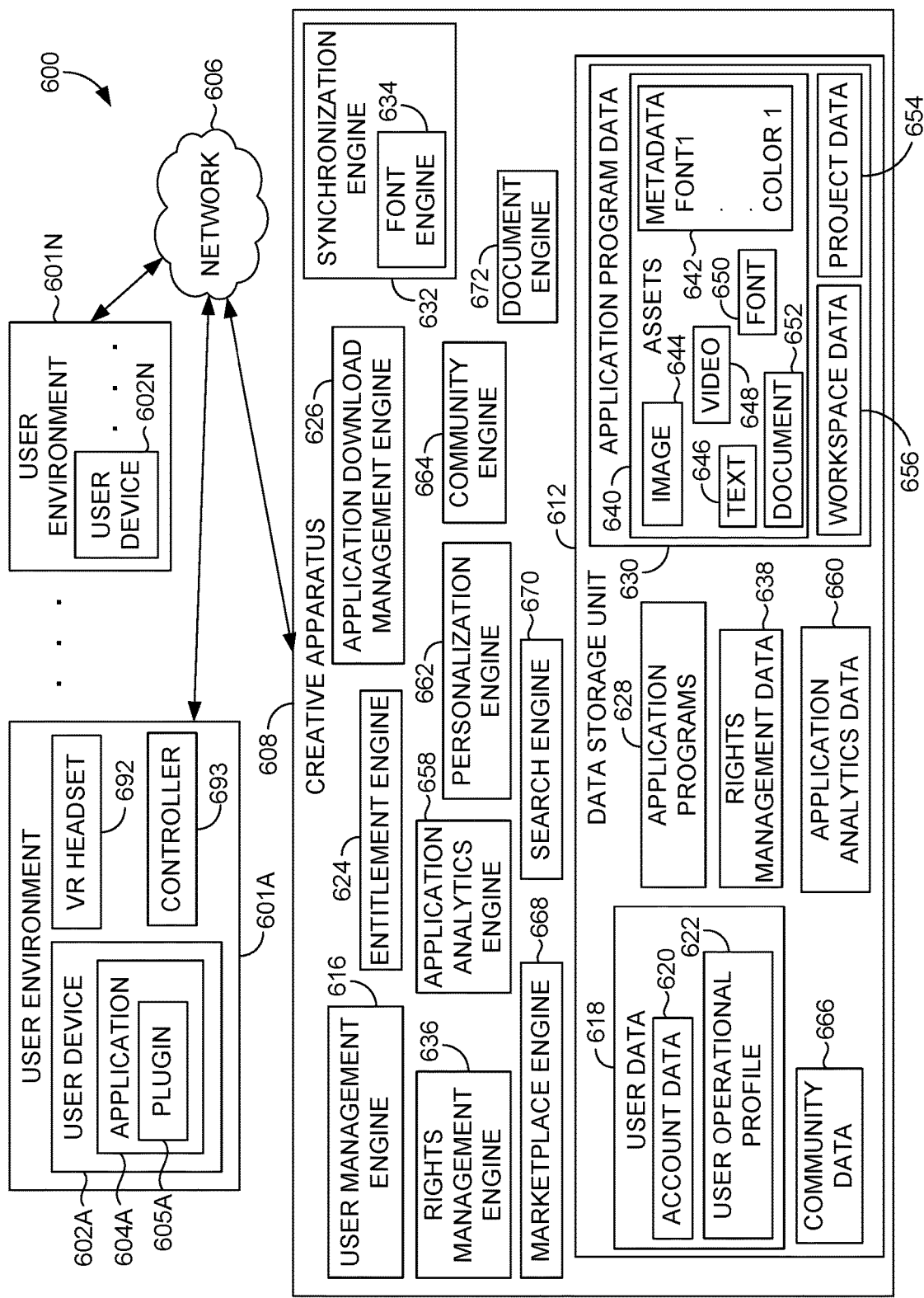
FIG. 6 is a block diagram of an exemplary computing environment in which embodiments of the invention may be employed.

FIG. 6 is a diagram of environment 600 in which one or more embodiments of the present disclosure can be practiced. Environment 600 includes one or more user environments (such as user environments 601A-601N) and one or more user devices (such as user devices 602A-602N). A user environment can include one or more components communicatively coupled to one another, and may include a VR system such as VR system 100 in FIG. 1. For example, user environment 601A includes user device 602A, VR headset 692 and controller 693. Examples of user devices include, but are not limited to, a personal computer (PC), a desktop computer, a gaming console, standalone VR headset a tablet computer, cellular telephone, a processing unit, any combination of these devices, or any other suitable device having one or more processors. Each user device includes at least one application supported by creative apparatus 608. Other variations and configurations may be implemented within the present disclosure. It is to be appreciated that following description may generally refer to user device 602A as an example, and any other user device can be used.

A user of the user device can utilize various products, applications, or services supported by creative apparatus 608 via network 606. User devices 602A-602N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 608.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 602A-602N can be connected to creative apparatus 608 via network 606. Examples of network 606 include, but are not limited to, internet, local area network (LAN), wireless area network, wired area network, wide area network, and the like.

Creative apparatus 608 includes one or more engines for providing one or more digital experiences to the user. Creative apparatus 608 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 608 also includes data storage unit 612. Data storage unit 612 can be implemented as one or more databases or one or more data servers. Data storage unit 612 includes data that is used by the engines of creative apparatus 608.

A user of user device 602A visits a webpage or an application store to explore applications supported by creative apparatus 608. Creative apparatus 608 provides the applications as a software as a service (SaaS), or as a standalone application that can be installed on user device 602A, or as a combination. The user can create an account with creative apparatus 608 by providing user details and also by creating login details. Alternatively, creative apparatus 608 can automatically create login details for the user in response to receipt of the user details. In some embodiments, the user is also prompted to install an application manager. The application manager enables the user to manage installation of various applications supported by creative apparatus 608 and also to manage other functionalities, such as updates, subscription account and the like, associated with the applications. User details are received by user management engine 616 and stored as user data 618 in data storage unit 612. In some embodiments, user data 618 further includes account data 620 under which the user details are stored.

The user can either opt for a trial account or can make payment based on type of account or subscription chosen by the user. Alternatively, the payment can be based on product or number of products chosen by the user. Based on payment details of the user, user operational profile 622 is generated by entitlement engine 624. User operational profile 622 is stored in data storage unit 612 and indicates entitlement of the user to various products or services. User operational profile 622 also indicates type of user, i.e. free, trial, student, discounted, or paid.

In some embodiment, user management engine 616 and entitlement engine 624 can be one single engine performing the functionalities of both the engines.

The user can then install various applications supported by creative apparatus 608 via an application download management engine 626. Application installers or application programs 628 present in data storage unit 612 are fetched by application download management engine 626 and made available to the user directly or via the application manager. In one embodiment, an indication of all application programs 628 are fetched and provided to the user via an interface of the application manager. In another embodiment, an indication of application programs 628 for which the user is eligible based on user's operational profile are displayed to the user. The user then selects application programs 628 or the applications that the user wants to download. Application programs 628 are then downloaded on user device 602A by the application manager via the application download management engine 626. Corresponding data regarding the download is also updated in user operational profile 622. Application program 628 is an example of the digital tool. Application download management engine 626 also manages the process of providing updates to user device 602A.

Upon download, installation and launching of an application program, in one embodiment, the user is asked to provide the login details. A check is again made by user management engine 616 and entitlement engine 624 to ensure that the user is entitled to use the application program. In another embodiment, direct access is provided to the application program as the user is already logged into the application manager.

The user uses one or more application programs (e.g., application 604A) installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 630 in data storage unit 612 by synchronization engine 632. Alternatively or additionally, such data can be stored at the user device, such as user device 602A.

Application program data 630 includes one or more assets 640. Assets 640 can be a shared asset which the user wants to share with other users or which the user wants to offer on a marketplace. Assets 640 can also be shared across multiple application programs 628. Each asset includes metadata 642. Examples of metadata 642 include, but are not limited to, font, color, size, shape, coordinate, a combination of any of these, and the like. In addition, in one embodiment, each asset also includes a file. Examples of the file include, but are not limited to, image 644, text 646, video 648, font 650, document 652, a combination of any of these, and the like. In another embodiment, an asset only includes metadata 642.

Application program data 630 also include project data 654 and workspace data 556. In one embodiment, project data 654 includes assets 640. In another embodiment, assets 640 are standalone assets. Similarly, workspace data 656 can be part of project data 654 in one embodiment while it may be standalone data in other embodiment.

A user can operate one or more user device to access data. In this regard, application program data 630 is accessible by a user from any device, including a device which was not used to create assets 640. This is achieved by synchronization engine 632 that stores application program data 630 in data storage unit 612 and enables application program data 630 to be available for access by the user or other users via any device. Before accessing application program data 630 by the user from any other device or by any other user, the user or the other user may need to provide login details for authentication if not already logged in. In some cases, if the user or the other user are logged in, then a newly created asset or updates to application program data 630 are provided in real time. Rights management engine 636 is also called to determine whether the newly created asset or the updates can be provided to the other user or not. Workspace data 656 enables synchronization engine 632 to provide a same workspace configuration to the user on any other device or to the other user based on rights management data 638.

In various embodiments, various types of synchronization can be achieved. For example, the user can pick a font or a color from user device 602A using a first application program and can use the font or the color in a second application program on any other device. If the user shares the font or the color with other users, then the other users can also use the font or the color. Such synchronization generally happens in real time. Similarly, synchronization of any type of application program data 630 can be performed.

In some embodiments, user interaction with applications (e.g., application 604A) is tracked by application analytics engine 658 and stored as application analytics data 660. Application analytics data 660 includes, for example, usage of a tool, usage of a feature, usage of a workflow, usage of assets 640, and the like. Application analytics data 660 can include the usage data on a per user basis and can also include the usage data on a per tool basis or per feature basis or per workflow basis or any other basis. Application analytics engine 658 embeds a piece of code in applications (e.g., application 604A) that enables the application to collect the usage data and send it to application analytics engine 658. Application analytics engine 658 stores the usage data as application analytics data 660 and processes application analytics data 660 to draw meaningful output. For example, application analytics engine 658 can draw an output that the user uses "Tool 4" a maximum number of times. The output of application analytics engine 658 is used by personalization engine 662 to personalize a tool menu for the user to show "Tool 4" on top. Other types of personalization can also be performed based on application analytics data 658. In addition, personalization engine 662 can also use workspace data 656 or user data 618 including user preferences to personalize one or more application programs 628 for the user.

In some embodiments, application analytics data 660 includes data indicating status of a project of the user. For example, if the user was preparing an article in a digital publishing application and what was left was publishing the prepared article at the time the user quit the digital publishing application, then application analytics engine 658 tracks the state. Now when the user next opens the digital publishing application on another device, then the user is indicated and the state and options are provided to the user for publishing using the digital publishing application or any other application. In addition, while preparing the article, a recommendation can also be made by synchronization engine 632 to incorporate some of other assets saved by the user and relevant for the article. Such a recommendation can be generated using one or more engines, as described herein.

Creative apparatus 608 also includes community engine 664 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 640. Community engine 664 stores any data corresponding to the community, such as work shared on the community and comments or likes received for the work as community data 666. Community data 666 also includes notification data and is used for notifying other users by the community engine in case of any activity related to the work or new work being shared. Community engine 664 works in conjunction with synchronization engine 632 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 664 and synchronization engine 632. In collaborative workflows, a plurality of users is assigned different tasks related to the work.

Creative apparatus 608 also includes marketplace engine 668 for providing marketplace to one or more users. Marketplace engine 668 enables the user to offer an asset for selling or using. Marketplace engine 668 has access to assets 640 that the user wants to offer on the marketplace. Creative apparatus 608 also includes search engine 670 to enable searching of assets 640 in the marketplace. Search engine 670 is also a part of one or more application programs 628 to enable the user to perform search for assets 640 or any other type of application program data 630. Search engine 670 can perform a search for an asset using metadata 642 or the file.

Creative apparatus 608 also includes document engine 672 for providing various document related workflows, including electronic or digital signature workflows, to the user. Document engine 672 can store documents as assets 640 in data storage unit 612 or can maintain a separate document repository (not shown in FIG. 6).

In accordance with embodiments of the present invention, application programs 628 include an application such as a video editing application that facilitates VR video playback. In these embodiments, the application is provided to a user device (such as user device 602N) such that the application operates via the user device. In another embodiment, a VR video playback tool (e.g., plugin 605A) is provided as an add-on or plug-in to an application such as a video editing application (e.g., application 604A), as further described with reference to FIG. 1 above. These configurations are merely exemplary, and other variations for providing VR video playback software functionality are contemplated within the present disclosure.

It is to be appreciated that the engines and working of the engines are described as examples herein, and the engines can be used for performing any step in providing digital experience to the user.

Exemplary Operating Environment

Figure 7:
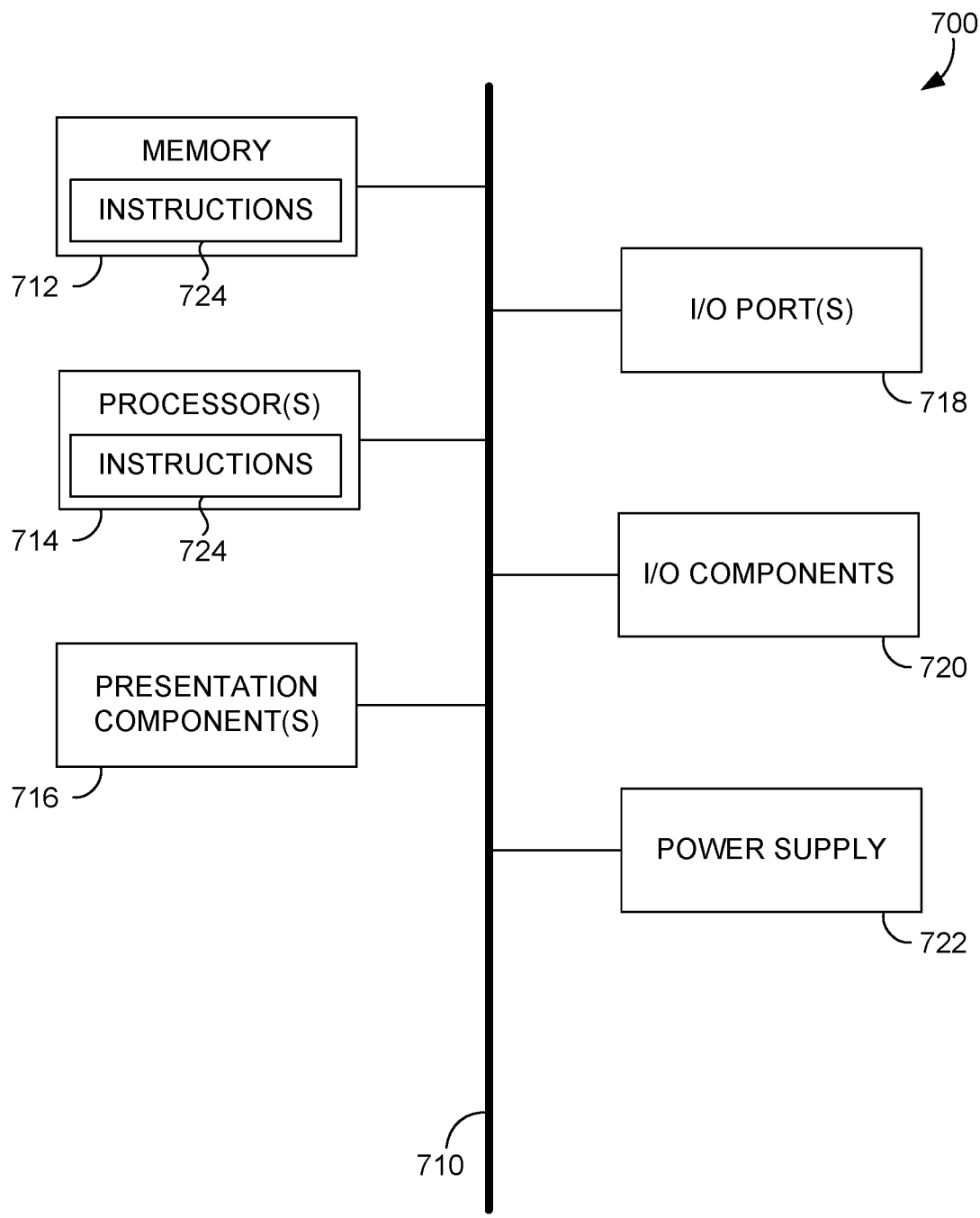
FIG. 7 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 700. Computing device 700 may be equipped with depth cameras, such as stereoscopic camera systems, infrared camera systems, RGB camera systems, touchscreen technology, and combinations of these, for gesture detection and recognition. Additionally, the computing device 700 may be equipped with accelerometers or gyroscopes that enable detection of motion. The output of the accelerometers or gyroscopes may be provided to the display of computing device 700 to render immersive augmented reality or virtual reality.

Embodiments described herein facilitate VR video playback using handheld controller rotations. Components described herein refer to integrated components of a VR system. The integrated components refer to the hardware architecture and software framework that support functionality using the VR system. The hardware architecture refers to physical components and interrelationships thereof and the software framework refers to software providing functionality that can be implemented with hardware embodied on a device.

The end-to-end software-based VR system can operate within the VR system components to operate computer hardware to provide VR system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the VR system components can manage resources and provide services for the VR system functionality. Any other variations and combinations thereof are contemplated with embodiments of the present invention.

Having identified various components in the present disclosure, it should be understood that any number components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for controlling VR video playback, the method comprising:
   detecting a triggering event based on state information of a handheld controller capable of detecting 3D rotations of the handheld controller;
   upon detecting the triggering event, detecting a 3D gesture made with the handheld controller by determining a 1D rotational direction of a 3D controller rotation of the handheld controller;
   initializing a command associated with changes in the determined 1D rotational direction, wherein the determined 1D rotational direction of the 3D controller rotation is yaw or pitch, wherein the initialized command associated with changes in the determined 1D rotational direction is a jog command of the VR video or a shuttle command of the VR video;
   detecting a subsequent 3D controller rotation of the handheld controller in an initialized rotational direction matching the determined 1D rotational direction; and
   determining a playback adjustment of a VR video based on the initialized command and the subsequent 3D controller rotation.

2. The method of claim 1, wherein the determining of the 1D rotational direction comprises, upon detecting the triggering event:
   periodically accessing a controller orientation of the handheld controller;
   tracking a plurality of rotational directions of the handheld controller by comparing the controller orientation at a first time with the controller orientation at a second time; and
   determining the 1D rotational direction as one of the plurality of rotational directions that first exceeds a defined initialization threshold.

3. The method of claim 1, wherein the determined 1D rotational direction of the 3D controller rotation is yaw, and wherein the initialized command associated with changes in yaw is a jog command of the VR video.

4. The method of claim 1, wherein the initialized command is the jog command, and wherein the playback adjustment is an adjustment of a defined number of frames of the VR video for each movement of the subsequent 3D controller rotation through a defined angular increment.

5. The method of claim 1, wherein the initialized command is the shuttle command, and wherein the playback adjustment is an adjustment of a factor change in playback speed of the VR video for each movement of the subsequent 3D controller rotation through a defined angular increment.

6. The method of claim 1, additionally comprising defining a frame of reference, wherein the determining of the 1D rotational direction is with respect to the defined frame of reference.

7. The method of claim 6, wherein the defined frame of reference is based on a controller orientation of the handheld controller at a time associated with the triggering event.

8. The method of claim 6, wherein the defined frame of reference is based on a controller calibration.

9. The method of claim 1, additionally comprising:
   triggering a visualization of available gestures once the triggering event is detected;
   replacing the visualization of available gestures with a visualization of a progress bar corresponding to the initialized command, when the command is initialized; and
   triggering an update of the visualization of the progress bar based on the subsequent 3D controller rotation.

10. One or more computer storage media storing computer-useable instructions that, when used by one or more computing devices, cause the one or more computing devices to perform operations comprising:
    determining a 1D rotational direction of a 3D controller rotation of a handheld controller capable of detecting 3D rotations of the handheld controller;
    initializing a command associated with the determined 1D rotational direction, wherein the command comprises a jog command or a shuttle command;
    replacing, based on initializing the command, a first visualization of available gestures with a second visualization of a progress bar corresponding to the initialized command;
    during a defined duration, detecting a subsequent 3D controller rotation of the handheld controller considering only an initialized direction associated with the initialized command;
    generating a control signal for the initialized command, wherein the control signal indicates the subsequent 3D controller rotation of the handheld controller; and
    providing the control signal to facilitate a playback adjustment of a VR video.

11. The media of claim 10, wherein the determining of the 1D rotational direction comprises:
    periodically accessing a controller orientation of the handheld controller;
    tracking a plurality of rotational directions of the handheld controller by comparing the controller orientation at a first time with the controller orientation at a second time; and determining the 1D rotational direction as one of the plurality of rotational directions that first exceeds a defined initialization threshold.

12. The media of claim 10, wherein the determined 1D rotational direction of the 3D controller rotation is pitch, and wherein the initialized command associated with changes in pitch is a shuttle command of the VR video.

13. The media of claim 10:
wherein the operations additionally comprise defining a frame of reference, and
wherein the determining of the 1D rotational direction is with respect to the defined frame of reference.

14. The media of claim 10, wherein the initialized direction matches the determined 1D rotational direction.

15. The media of claim 10, wherein the operations additionally comprise:
detecting a triggering event based on state information of the handheld controller, wherein the determining of the 1D rotational direction of the 3D controller rotation is based on the detecting of the triggering event;
triggering the first visualization of available gestures once the triggering event is detected;
after the replacing of the first visualization of available gestures with the second visualization of the progress bar, triggering an update of the second visualization of the progress bar based on the subsequent 3D controller rotation.

16. A computer system comprising:
one or more hardware processors and memory configured to provide computer program instructions to the one or more hardware processors;
a triggering component configured to utilize the one or more hardware processors to detect a triggering event based on state information of a handheld controller capable of detecting 3D rotations of the handheld controller;
a means for initializing a command associated with changes in a determined 1D rotational direction of a 3D controller rotation of the handheld controller, wherein the initialized command associated with changes in the determined 1D rotational direction is a jog command of the VR video or a shuttle command of the VR video; and
a means for determining a playback adjustment of a VR video based on the initialized command and a subsequent 3D controller rotation of the handheld controller.

17. The computer system of claim 16, wherein the means for initializing the command is configured to:
track a plurality of rotational directions of the handheld controller to determine a 1D rotational direction of the 3D controller rotation; and
initialize the command based on the determined 1D rotational direction.

18. The computer system of claim 17, wherein the means for initializing the command is configured to initialize the jog command when the determined 1D rotational direction is yaw, and wherein the means for initializing the command is configured to initialize the shuttle command when the determined 1D rotational direction is pitch.

19. The computer system of claim 17, wherein the means for initializing the command is configured to determine the 1D rotational direction with respect to a controller orientation of the handheld controller at a time associated with the triggering event.

20. The computer system of claim 16, wherein the means for determining a playback adjustment is configured to determine the playback adjustment based on defined angular increments of the subsequent 3D controller rotation.

* * * * *